United States Patent
Nurmi et al.

(10) Patent No.: US 9,239,674 B2
(45) Date of Patent: Jan. 19, 2016

(54) METHOD AND APPARATUS FOR PROVIDING DIFFERENT USER INTERFACE EFFECTS FOR DIFFERENT IMPLEMENTATION CHARACTERISTICS OF A TOUCH EVENT

(75) Inventors: Mikko Antero Nurmi, Tampere (FI); Jouni Tapio Solismaa, Tampere (FI)

(73) Assignee: Nokia Technologies Oy, Espoo (FI)

( * ) Notice: Subject to any disclaimer, the term of this patent is extended or adjusted under 35 U.S.C. 154(b) by 595 days.

(21) Appl. No.: 12/971,230

(22) Filed: Dec. 17, 2010

(65) Prior Publication Data
US 2012/0159402 A1    Jun. 21, 2012

(51) Int. Cl.
*G06F 3/033*    (2013.01)
*G06F 3/0488*    (2013.01)

(52) U.S. Cl.
CPC .................................. *G06F 3/04883* (2013.01)

(58) Field of Classification Search
CPC .............................. G06F 3/048; G06F 3/04883
USPC ......................................................... 715/863
See application file for complete search history.

(56) References Cited

U.S. PATENT DOCUMENTS

| | | | |
|---|---|---|---|
| 2007/0200953 A1* | 8/2007 | Liu et al. ........................ | 348/561 |
| 2007/0247435 A1 | 10/2007 | Benko et al. | |
| 2007/0257890 A1 | 11/2007 | Hotelling et al. | |
| 2008/0309632 A1 | 12/2008 | Westerman et al. | |
| 2009/0034800 A1* | 2/2009 | Vau et al. ....................... | 382/107 |
| 2009/0153288 A1* | 6/2009 | Hope et al. ..................... | 340/3.1 |
| 2011/0012848 A1* | 1/2011 | Li et al. ........................... | 345/173 |
| 2011/0074710 A1* | 3/2011 | Weeldreyer et al. ........... | 345/173 |
| 2011/0238676 A1* | 9/2011 | Liu et al. ......................... | 707/752 |

FOREIGN PATENT DOCUMENTS

| | | |
|---|---|---|
| EP | 1 860 536 A2 | 11/2007 |
| EP | 2 192 498 A1 | 6/2010 |
| WO | WO 2009/121227 A1 | 10/2009 |

OTHER PUBLICATIONS

International Search Report/Written Opinion for Application No. PCT/FI2011/051009 dated Apr. 11, 2012.

* cited by examiner

*Primary Examiner* — Angie Badawi
(74) *Attorney, Agent, or Firm* — Alston & Bird LLP

(57) ABSTRACT

A method for providing a mechanism by which different user interface effects may be performed for different classifications of gestures may include receiving an indication of a touch event at a touch screen display, determining a gesture classification and an implementation characteristic classification for the touch event, and enabling provision of substantively different user interface effects for respective different implementation characteristic classifications of the gesture classification. A corresponding apparatus and computer program product are also provided.

20 Claims, 6 Drawing Sheets

METHOD AND APPARATUS FOR PROVIDING DIFFERENT USER INTERFACE EFFECTS FOR DIFFERENT IMPLEMENTATION CHARACTERISTICS OF A TOUCH EVENT

TECHNOLOGICAL FIELD

Some example embodiments of the present invention relate generally to user interface technology and, more particularly, relate to a method and apparatus for providing a mechanism by which different user interface effects may be performed for different classifications of implementation characteristics of a touch event such as a gesture.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, web browsing, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, electronic book or reading device, etc.

In many situations, it may be desirable for the user to interface with a device such as a mobile terminal for the provision of an application or service. A user's experience during certain applications such as, for example, web browsing or navigating through content may be enhanced by using a touch screen display as the user interface. Another way to enhance the interaction is to use finger hovering where user can move his fingers above the device surface to create different interactions. Furthermore, some users may have a preference for use of a touch screen display for entry of user interface commands over other alternatives. In recognition of the utility and popularity of touch screen displays, many devices, including some mobile terminals, now employ touch screen displays. As such, touch screen devices are now relatively well known in the art, with numerous different technologies being employed for sensing a particular point at which an object may contact the touch screen display.

BRIEF SUMMARY

A method, apparatus and computer program product are provided to enable the provision of a mechanism by which different user interface effects may be performed for different classifications of gestures. In some cases, for example, the effect that is performed for a particular gesture (e.g., zooming for a pinch gesture) may be altered when a threshold for a particular characteristic associated with the gesture is met. As such, for example, a first user interface effect may be performed until the threshold is met and a second user interface effect may be performed after the threshold is crossed.

Some embodiments of the invention may provide a method, apparatus and computer program product for improving user experience relating to devices having touch screen interfaces. As a result, for example, mobile terminal users may enjoy improved capabilities with respect to content navigation and other services or applications that may be used in connection with a touch screen display.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
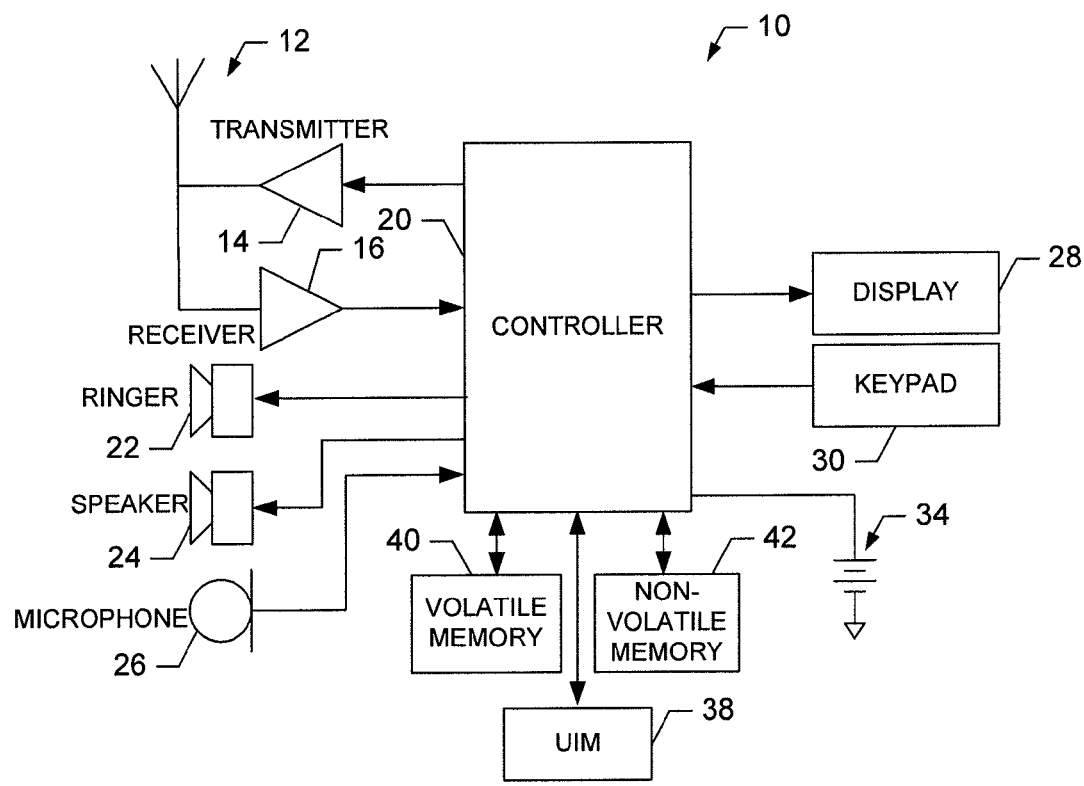
FIG. 1 is a schematic block diagram of a mobile terminal according to an example embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

The use of a touch screen interface is often attractive to users due to the generally intuitive nature of the interface. Various activities such as selecting an object, dragging an object, drawing a symbol, turning a page, zooming in or out, and/or the like, are often performed using simple gestures that seem to naturally coincide with the resulting activity. Moreover, some activities can be performed in direct correlation to a particular characteristic of the initiating gesture (e.g., an implementation characteristic). For example, if a finger swipe is used to scroll, the speed of the finger swipe may be correlated to the speed of the scrolling. In such examples, a slow swipe would cause a slow scroll speed. Meanwhile, a fast swipe speed would cause rapid scrolling. Similarly, a pinch gesture might be used to zoom such that a slow or small pinch would cause a slow zoom effect or a small magnitude of zoom (e.g., 5% zoom). Meanwhile, a fast or large zoom event may cause a faster zoom effect or a larger magnitude of zoom (e.g., 25% zoom). However, in all cases, the same general effect (e.g., zooming proportional to speed or magnitude) is performed over the entire range of implementation characteristics of a certain type. In other words, swiping always results in a scroll effect that is proportional to the speed or magnitude of the swipe or pinching always results in a zoom effect that is proportional to the speed or magnitude of pinch.

Some embodiments of the present invention may relate to the provision of a mechanism by which different user interface effects may be performed for different classifications of implementation characteristics of a particular gesture. Thus, for example, in the case of a particular touch event (e.g., a pinch in or pinch out event), a first type of user interface effect may be induced when the touch event occurs with an implementation characteristic (e.g., speed of pinch) that is low and a second type of user interface effect may be induced when the touch event occurs when the implementation characteristic is high. The first and second types of user interface effects may be different from each other in a manner other than simply a matter of degree. In this regard, having a slow swipe or pinch induce slow scrolling or zooming while a fast swipe or pinch induces faster scrolling or zooming merely induces a change that is different only in degree and not in substance. Example embodiments may provide for substantive differences between the first and second types or classes of user interface effects. For example, a slow pinch may result in slow zooming where the zoom rate is proportional to the speed of the gesture. However, a fast pinch (e.g., having a speed greater than a particular threshold) may trigger a substantively different zoom effect such as, for example, instantly zooming to a next level of detail or object presentation level.

It should be appreciated that, in the context of example embodiments, an implementation characteristic relates to a characterization of the manner in which a particular gesture is performed. Thus, for example, implementation characteristics may include different relative or objective classifications for various specific gestures that can be implemented or detected on a touch screen display and may include such characteristics as speed of touch-related movement, magnitude or size of touch-related movement, pressure of touch, timing factors (e.g., length of pause, frequency, etc.), and/or the like. Characteristics such as a number of objects involved in causing a touch event, direction and shape are generally not considered to be implementation characteristics in the context of example embodiments of the present invention since those characteristics are typically used to define different gestures entirely and would not normally be distinct descriptors of variations in ways in which a particular gesture can be performed.

In some cases, touch events for which example embodiments may be employed may include those touch events that are received in association with a content item (e.g., an image, video, file, song, album, document, map, message or other digital content/or object associated with such digital content).

FIG. 1, one example embodiment of the invention, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a controller 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the controller 20 may include circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (display 28 providing an example of such a touch display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch display may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element (not shown) in order to capture images or video of objects, people and places proximate to the user of the mobile terminal 10. However, the mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, in which certain elements of an apparatus 50 for providing a mechanism by which relevant content may be determined and/or presented are displayed. The apparatus 50 of FIG. 2 may be employed, for example, in conjunction with the mobile terminal 10 of FIG. 1. However, it should be noted that the apparatus 50 of FIG. 2, may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer or other user terminal. Moreover, in some cases, the apparatus 50 may be on a fixed device such as server or other service platform and the content may be presented (e.g., via a server/client relationship) on a remote device such as a user terminal (e.g., the mobile terminal 10) based on processing that occurs at the fixed device.

Figure 2:
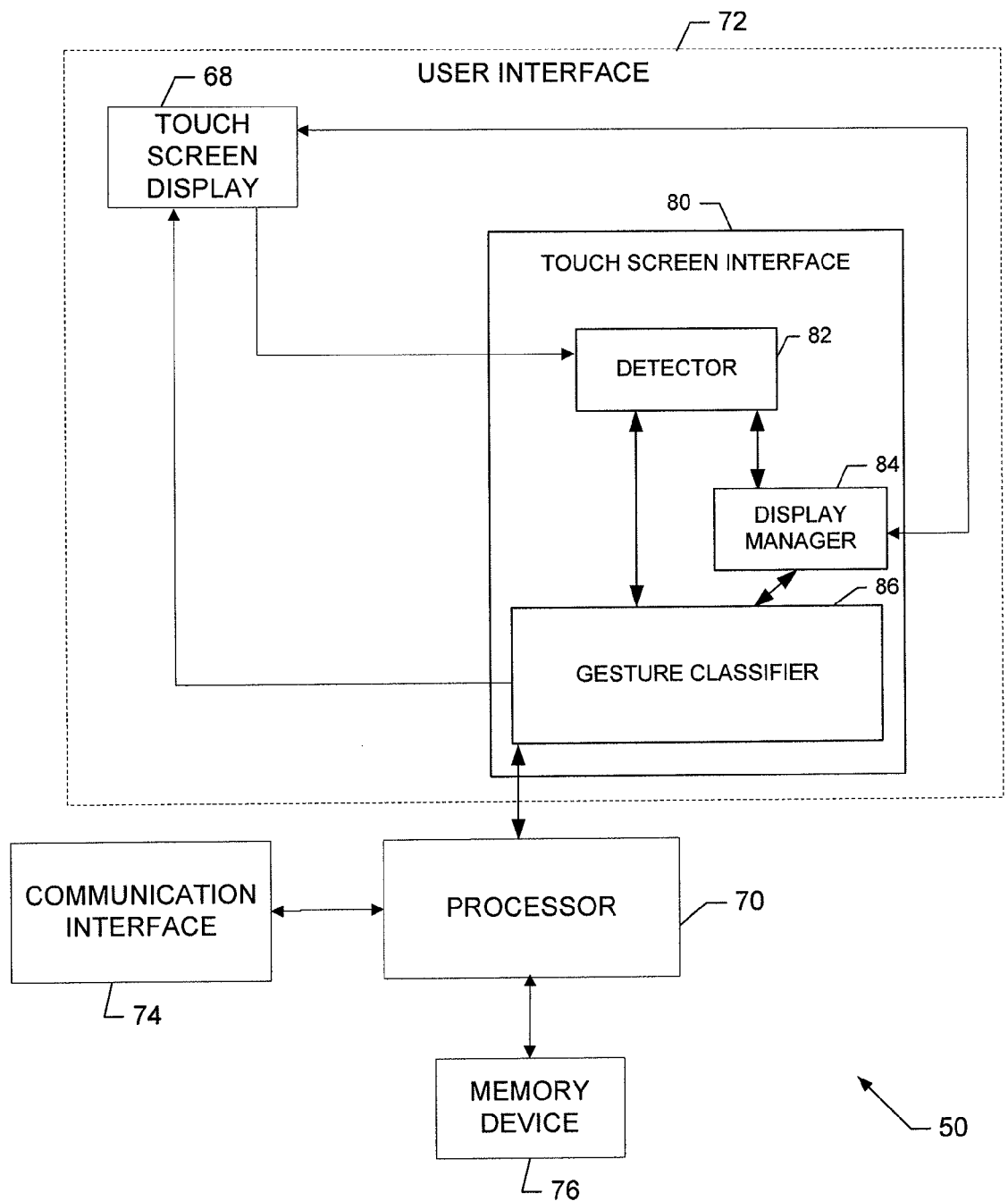
FIG. 2 is a schematic block diagram of an apparatus for providing a mechanism by which different user interface effects may be performed for different classifications of gestures according to an example embodiment of the present invention.

It should also be noted that while FIG. 2 illustrates one example of a configuration of an apparatus for providing a mechanism by which different user interface effects may be performed for different classifications of gestures, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 2, the apparatus 50 for providing a mechanism by which different user interface effects may be performed for different classifications of gestures is provided and may include or otherwise be in communication with a processor 70, a user interface 72, a communication interface 74 and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen(s), touch areas, device surfaces capable of detecting objects hovering over the surface, soft keys, a microphone, a speaker, or other input/output mechanisms. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the apparatus 50 may include or otherwise be in communication with a touch screen display 68 (e.g., the display 28). In different example cases, the touch screen display 68 may be a two dimensional (2D) or three dimensional (3D) display. The touch screen display 68 may be embodied as any known touch screen display. Thus, for example, the touch screen display 68 could be configured to enable touch recognition by any suitable technique, such as resistive, capacitive, infrared, strain gauge, surface wave, optical imaging, dispersive signal technology, acoustic pulse recognition, etc. techniques. The user interface 72 may be in communication with the touch screen display 68 to receive indications of user inputs at the touch screen display 68 and to modify a response to such indications based on corresponding user actions that may be inferred or otherwise determined responsive to the indications. In one alternative, a touch input may be provided other than by direct interaction with a display (e.g., in cases where the user interface is projected onto a wall with a projector).

In an example embodiment, the apparatus 50 may include a touch screen interface 80. The touch screen interface 80 may, in some instances, be a portion of the user interface 72. However, in some alternative embodiments, the touch screen interface 80 may be embodied as the processor 70 or may be a separate entity controlled by the processor 70. As such, in some embodiments, the processor 70 may be said to cause, direct or control the execution or occurrence of the various functions attributed to the touch screen interface 80 (and any components of the touch screen interface 80) as described herein. The touch screen interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the touch screen interface 80 as described herein. Thus, in examples in which software is employed, a device or circuitry (e.g., the processor 70 in one example) executing the software forms the structure associated with such means.

The touch screen interface 80 may be configured to receive an indication of an input in the form of a touch event at the touch screen display 68. As such, the touch screen interface 80 may be in communication with the touch screen display 68 to receive indications of user inputs at the touch screen display 68 and to modify a response to such indications based on corresponding user actions that may be inferred or otherwise determined responsive to the indications. Following recognition of a touch event, the touch screen interface 80 may be configured to determine a classification of the touch event and provide a corresponding function based on the touch event in some situations.

In some embodiments, the touch screen interface 80 may include a detector 82, a display manager 84 and a gesture classifier 86. Each of the detector 82, the display manager 84 and the gesture classifier 86 may be any device or means embodied in either hardware or a combination of hardware and software configured to perform the corresponding functions associated with the detector 82, the display manager 84 and the gesture classifier 86, respectively, as described herein. In an exemplary embodiment, each of the detector 82, the display manager 84 and the gesture classifier 86 may be controlled by or otherwise embodied as the processor 70.

The detector 82 may be in communication with the touch screen display 68 to receive indications of user inputs in order to recognize and/or determine a touch event based on each input received at the detector 82. A touch event may be defined as a detection of an object, such as a stylus, finger, pen, pencil or any other pointing device, coming into contact with a portion of the touch screen display in a manner sufficient to register as a touch. In this regard, for example, a touch event could be a detection of pressure on the screen of the touch screen display 68 above a particular pressure threshold over a given area or the detection of a change in the electrostatic field of the touch screen display 68 at a particular location. As such, some touch events may not actually require physical contact with the touch screen display 68. For example, in some cases, the touch screen display 68 may be configured to detect one or more objects (e.g., a finger or fingers) hovering over the touch screen display 68. Interactions that involve objects that hover over the display can be especially useful features when used in connection with 3D displays where UI objects can appear to float visually on top of the device surface or float behind the device surface in the depth. Gestures associated with the object or objects may also be detected in some cases, even without physical contact with the touch screen display 68. Subsequent to each touch event, the detector 82 may be further configured to pass along the data corresponding to the touch event (e.g., location of touch, length of touch, number of objects touching, touch pressure, speed of movement, speed of finger movement towards the screen (when approaching the screen), direction of movement, length of delay, frequency of touch, etc.) to the gesture classifier 86 for gesture classification.

The gesture classifier 86 may be configured to recognize and/or determine a corresponding classification of a touch event. In other words, the gesture classifier 86 may be configured to perform gesture classification to classify the touch event as any of a number of possible gestures. Some examples of recognizable gestures may include a touch, multi-touch, stroke, character, symbol, shape, swipe, pinch event (e.g., a pinch in or pinch out) and/or the like.

A touch may be defined as a touch event that impacts a single area (without or with minimal movement on the surface of the touch screen display 68) and then is removed. A multi-touch may be defined as multiple touch events sensed at the same time (or nearly the same time). A stroke event may be defined as a touch event followed immediately by motion of the object initiating the touch event while the object remains in contact with the touch screen display 68. In other words, the stroke event may be defined by motion following a touch event thereby forming a continuous, moving touch event defining a moving series of instantaneous touch positions (e.g., as a drag operation or as a flick operation). Multiple strokes and/or touches may be used to define a particular shape or sequence of shapes to define a character. A pinch event may be classified as either a pinch out or a pinch in (hereinafter referred to simply as a pinch). A pinch may be defined as a multi-touch, where the touch events causing the multi-touch are spaced apart. After initial occurrence of the multi-touch event involving at least two objects, one or more of the objects may move substantially toward each other to simulate a pinch. Meanwhile, a pinch out may be defined as a multi-touch, where the touch events causing the multi-touch are relatively close together, followed by movement of the objects initiating the multi-touch substantially away from each other. In some cases, the objects on a pinch out may be so close together initially that they may be interpreted as a single touch, rather than a multi-touch, which then is modified by movement of two objects away from each other. In some examples, the objects associated with causing the multi-touch event may be spaced apart by any initial distance so long as the subsequent movement of the objects is in a direction apart from each other. Touch events may be performed as a single continuous gesture in some cases or may be made up of a series of successive smaller events.

In some embodiments, the gesture classifier 86 may be further enabled to determine implementation characteristics regarding the touch events (e.g., speed of touch-related movement, magnitude or size of touch-related movement, pressure of touch, timing factors (e.g., length of pause, frequency, etc.), and/or the like) in order to classify a particular gesture based on the implementation characteristics of the gesture. As such, for example, the gesture classifier 82 may classify the touch events relative to various thresholds or ranges of lengths or speeds of movement. Thus, the classification of a touch event may include gesture classification (e.g., as a swipe or pinch event) and classification of the implementation characteristics of the corresponding gesture classification (e.g., a fast swipe or pinch event versus a slow swipe or pinch event).

In an example embodiment, the gesture classifier 82 may compare implementation characteristics for a given gesture classification to respective different thresholds or levels that may be defined for the given gesture classification. For example, pinch gestures (e.g., pinch and pinch out gestures) may have a fast classification for implementation characteristics that indicate a speed of implementation of the pinch gesture that is above a threshold speed and a slow or normal classification for implementation characteristics that indicate a speed of implementation of the pinch gesture that is below the threshold speed. In some cases, each or at least a plurality of different gesture classifications (e.g., swipe, pinch, etc.) may have one or more corresponding different implementation characteristic classifications associated therewith.

In an example embodiment, the gesture classifier 86 may be configured to communicate detection information regarding the recognition, detection and/or classification of a touch event to the display manager 84. The display manager 84 may be configured to provide control over modifications made to that which is displayed on the touch screen display 68 based on the detection information received from the detector 82 and gesture classifications provided by the gesture classifier 86 in accordance with the responses prescribed for each respective gesture classification and implementation characteristic determined by the gesture classifier 86. In other words, the display manager 84 may configure the display (e.g., with respect to the content displayed and/or the user interface effects presented relative to the content displayed) according to the gesture classification and implementation characteristic classification determined for a given touch event that may be detected at the display.

In an example embodiment, the display manager 84 may be configured to apply user interface effects based on the gesture classification and implementation characteristic classification of a touch event received on the display. As such, for example, if a pinch event (e.g., pinch out) is determined as the gesture classification of a particular touch event, and the corresponding gesture classification (i.e., the pinch out in this case) correlates to a zooming out user interface effect, the display manager 84 may be configured to modify the display contents accordingly in order to visualize the user interface effect with respect to a content item associated with the particular touch event. In an example embodiment, the user interface effect may be different dependent upon the implementation characteristic classification that is determined for the classified gesture (in this case, the pinch out). Thus, for example, if the pinch out was performed at a speed below a threshold, a first user interface effect may be performed (e.g., zooming proportional to the speed). However, if the pinch out was performed at a speed above a threshold a second and substantively different user interface effect may be performed (e.g., zooming to a next larger object level).

As such, example embodiments may provide for an apparatus (e.g., the processor 70 or a chip set including the processor 70) for performing user interface effects that differ for a particular gesture classification based on the implementation characteristics used to initiate the touch event or gesture that caused the corresponding user interface effects. In some cases, the apparatus may be configured to receive an indication of a touch event at a touch screen display, determine a gesture classification and an implementation characteristic classification for the touch event, and cause or enable provision of substantively different user interface effects for respective different implementation characteristic classifications of the gesture classification.

Some example embodiments will be described below in connection with pinch events having substantively different zoom effects over respective different ranges of implementation characteristics related to the speed of the pinch events. As such, the examples described below, which have a proportional zoom effect for slow pinch events (e.g., zooming in or out for a pinch in or out, respectively, at a rate or with a magnitude that is proportional to the speed of the pinch event, and with a center determined by a position of the objects performing the pinch event), but have an instantaneous level-based zoom effect for fast pinch events (e.g., zooming in or out to a next object level view when the pinch speed is above a particular threshold). However, it should be appreciated that the examples described below are non-limiting examples and thus, example embodiments could also cover other user interface effects and other gestures or touch events consistent with the descriptions provided herein.

Figure 3:
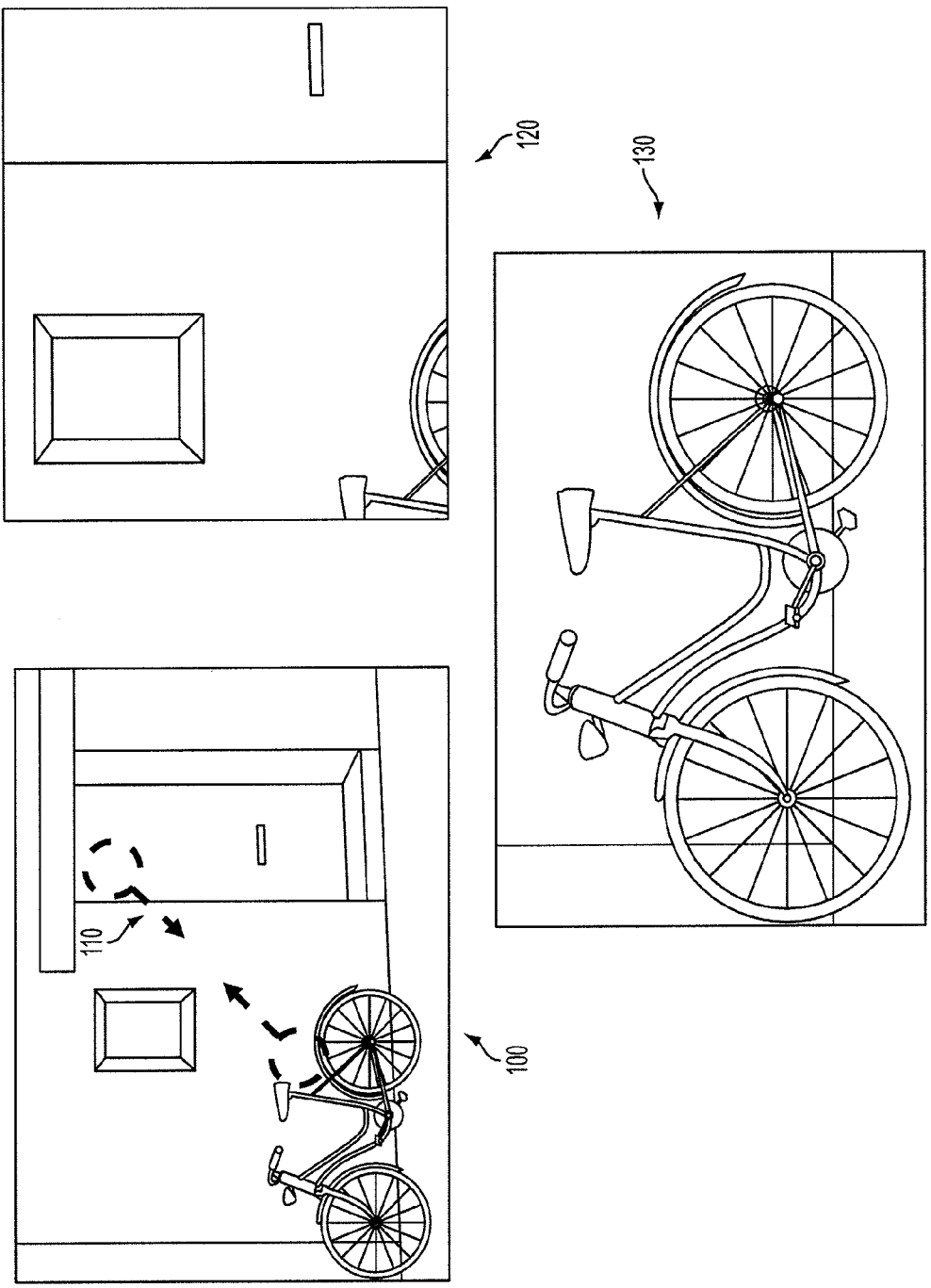
FIG. 3 is an example of a series of images illustrating operation of an example embodiment of the present invention.

FIG. 3 is an example of a series of images illustrating operation of an example embodiment. As shown in FIG. 3 a reference image 100 may initially be rendered on a display (e.g., touch screen display 68). Arrows 110 represent the occurrence of a touch event, namely a pinch in. The touch event is initially classified as a pinch in (e.g., based on the movement of two initially distant objects providing touch events on the display toward each other) during gesture classification. Implementation characteristics may then be evaluated to determine whether the touch event corresponds to a slow pinch in (e.g., a pinch in with movement of the objects that is below a threshold speed) or a fast pinch in (e.g., a pinch in with movement of the objects that is above a threshold speed). If a slow pinch in is determined, a proportional zoom may be performed as shown in proportional zoomed image 120. As can be seen from proportional zoomed image 120, the center of the zoom function was defined by the position of the objects performing the pinch in (in this example approximately centrally located between the initial position of the objects) and the zoom function was performed in the corresponding direction of the pinch in and at a rate proportional to the speed of the pinch in for the duration of the pinch in. If a fast pinch was instead determined, a substantively different zoom effect may be provided as shown in object level zoomed image 130. In this regard, the object level zoom function selected borders for the object level zoomed image 130 to keep the object (in this case a bicycle) within the view and eliminate other background information. Thus, two fundamentally or substantively different zoom functions (proportional zoom versus object level based zoom) could be performed for the same general gesture classification (e.g., pinch in) based on the implementation characteristic classification of the corresponding gesture classification.

In some cases, object level based zoom may utilize object recognition technology in order to determine objects and corresponding regions within an image that correspond to specific objects that could form the basis for object level based zooming. For example, the processor 70 (e.g., utilizing object recognition software) may be configured to examine the reference image 100 and determiner that an object (e.g., the bicycle) is located in the reference image 100. Thereafter, responsive to a fast pinch in, an object level based zoom function may be performed to isolate the object (e.g., the bicycle) in the image (as shown in object level zoomed image 130). However, in other embodiments, object level based zoom functionality may be performed responsive to tagged objects within images. In the case of multiple objects on the display, example embodiments may be configured to zoom in so that all objects are still shown, or zoom in so that the most important object is shown. Various ways to define what is important (or a level of importance or priority) may be employed such as, for example, earlier content usage data, user context, device context, and/or the like. In such an example, it may be assumed that the bicycle was a tagged object and that, therefore, when the fast pinch in was recognized, the object level based zoom functionality was performed relative to the bicycle as a tagged object. Object level based zooming may also be used to zoom to a view that includes all tagged objects at one level and then isolates tagged objects (perhaps by cycling through views zoomed in with respect to each sequential tagged object) individually or in groups thereafter responsive to additional object level based zooming. Similar functionality may also be employed in connection with videos, since videos are basically comprised of a series of images.

Figure 4:
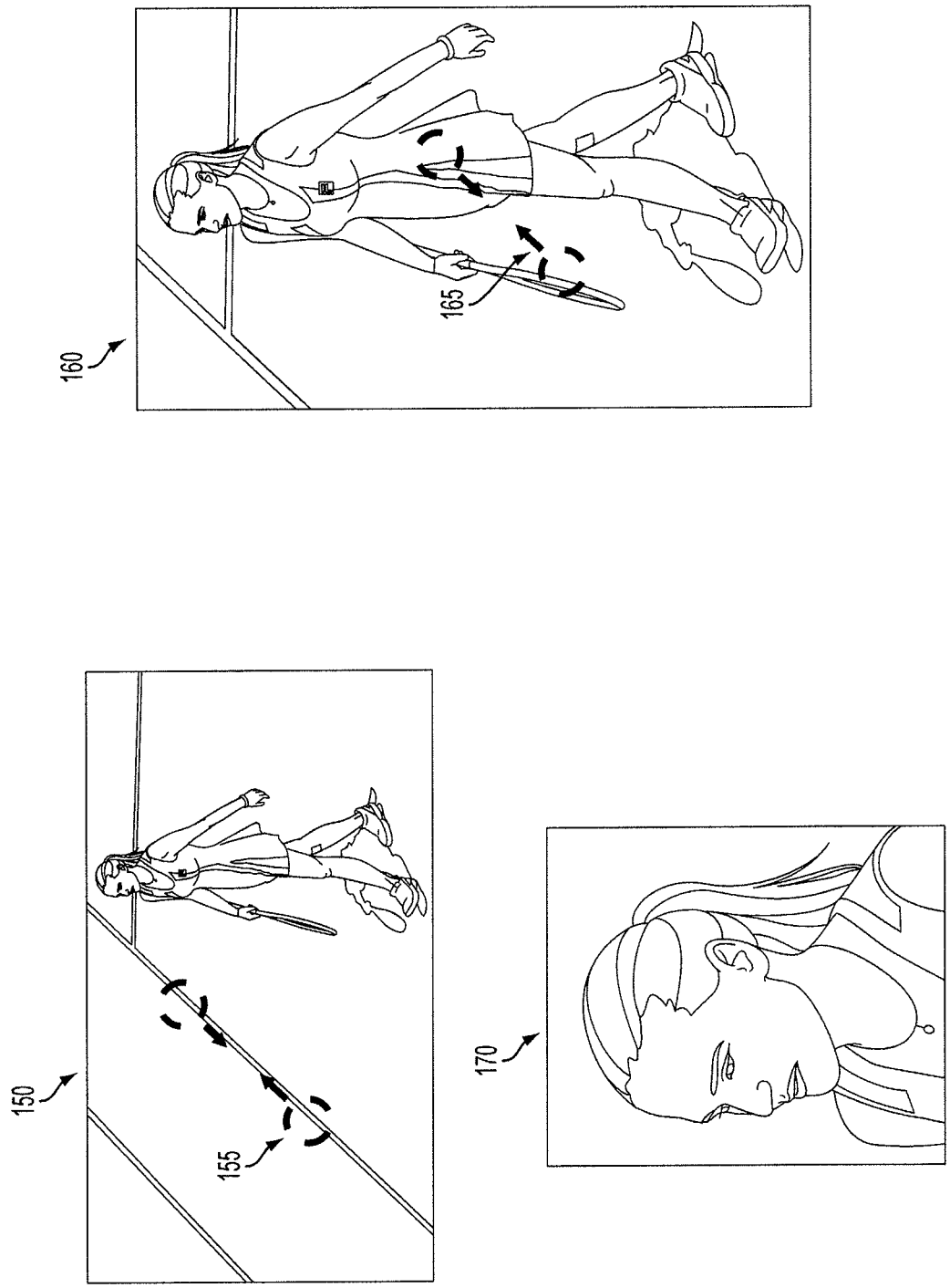
FIG. 4 illustrates a series of image showing zooming operations according to an example embodiment of the present invention.

In some cases, object levels may be defined for whole images relative to filling the display screen rather than (or in addition to) object levels being defined relative to objects within an image. Thus, for example, a full screen view could be considered to be an object level based zoom option and other levels could include a 75% view, 50%, 25%, etc. It should also be noted that example embodiments could alternatively or additionally be performed even where there are multiple objects (tagged or recognized) or multiple object levels defined for a particular object. FIG. 4 illustrates a reference image 150 showing a tennis player walking on a tennis court. Responsive to a fast pinch in (as indicated by arrows 155), a zoom function may instantaneously be performed to present first level zoomed image 160, which has eliminated background information to focus the image on the highest level object therein (namely the tennis player). Another fast pinch in (as indicated by arrows 165) may cause a zoom to the next lower object level in order to, in this example, focus the second level zoomed image 170 on the face or head of the tennis player. As should be appreciated from this example, numerous object levels may be provided based on the images and objects therein.

In an example embodiment, a fast pinch in the other direction (e.g., a fast pinch out) may reverse the object level zoom functionality. Thus, for example, starting with the second level zoomed image 170, a first fast pinch out may cause a zoom to the next object level to provide the first level zoomed image 160. Then, in response to a second fast pinch out, the reference image 150 may be rendered. This may provide a very simple mechanism by which to quickly view an image with different level perspectives and easily restore the image to its initial size. Proportional zooming would require the user to try to guess at the original size and manually adjust the size of the image to try to approximate that original size.

Accordingly, as indicated above, example embodiments may provide for the use of implementation characteristic classification to get multiple different user interface effects from a single type or class of touch gesture. The different user effects may include a first effect that is accomplished based on a first implementation characteristic classification for a given touch gesture and a second effect that is accomplished based on a second implementation characteristic classification for the same given touch gesture. The different effects may include, for example, conducting proportional or free zooming for one implementation characteristic classification and performing object level based zooming for another implementation characteristic classification. The object level based zooming may include an instantaneous zoom to a next level (in any direction). The levels may include specifically defined zoom levels relating to the viewing screen (e.g., full screen, 120% view, 80% view, etc.) or relating to respective different views of objects based on the level of the objects. In one example embodiment, a certain pinch zoom may be employed to take an image to a full screen view and faster zoom could be used to show the image on an external bigger screen like a projector or tv.

It should be appreciated that although FIGS. 3 and 4 illustrate example embodiments being practiced in relation to user interface effects being applied to images, example embodiments may also be practiced in connection with other content items as well. Thus, for example, videos, files, songs, albums, documents, maps, messages or other digital content/or objects associated with such digital content may also be used in connection with example embodiments. In a video, for example, object level zooming may work similar to the description provided above for images. For a song, for example, object level zooming may quickly find verses, the refrain, or various other sections of interest within the song that may be tagged or determinable by analysis of the acoustics of the song. In a gallery of albums, for example, object level zooming may be used to isolate albums associated with the same genre, year of release or artist, or to isolate songs from the same album when navigating to lower levels within the gallery. Documents may be navigated, for example, to find different headings or chapters or zooming may be employed to shift between page level zooming, paragraph level zooming, sentence level zooming, etc. Maps may be navigated based on routes, portions of routes, or specific points of interest on a map or along a route. As another example, some embodiments may be employed for an application grid with icons. For example, if a user makes a fast pinch movement (or any other gesture at a speed above a threshold) for an icon, the application may be opened in a full screen mode. Meanwhile, if the user makes slow pinch movement (e.g., at a speed below the threshold) for the icon, the application may be opened in a smaller screen or as an application widget. In some embodiments, pinch speed (or other gesture speed) could be used to define, for a 3D object, how many 3D layers are to be revealed or what is the total depth of 3D effects to be used. Thus, for example, for gestures implemented with certain implementation characteristics, objects or details regarding objects may be added or removed in accordance with a hierarchical organization for detail level presentation. This can apply, for example, to the navigation between layers in a 3D environment, to the addition or removal of image details or objects based on priority or an importance ranking, or other similar situations.

As indicated above, some example embodiments may consider the number of objects to be an implementation characteristic that may be used as a distinguishing factor for initiating various different user interface effects. As an example, using two fingers (or other objects) to make a particular gesture (e.g., a pinch gesture) may cause a first user interface effect (e.g., a zoom function to a predefined level of zoom such as 75%). Meanwhile, using three fingers may initiate a zoom function to another level (e.g., a larger view that includes a toolbar), and using four fingers may initiate a zoom function to still another level (e.g., a full screen view).

In some examples, the different user interface effects that may be employed for corresponding different gesture classifications may not directly operate of the content itself. Instead, user interface effects may be associated with some gesture classification to implement directly assigned commands to the corresponding gestures. For example, if a gesture is performed with respect to an image, direct actions may be assigned to objects that can be recognized within the image. The action may include confirming an identity of the object, initiating contact with the object, launching an application associated with the object, calling up a table of contents or index to facilitate content navigation, initiating an album view, or numerous other functions. Moreover, in some cases, the functions defined for a particular gesture classification may vary dynamically. Thus, for example, a function associated with a particular gesture classification may differ when the same gesture is performed a subsequent time.

Figure 5:
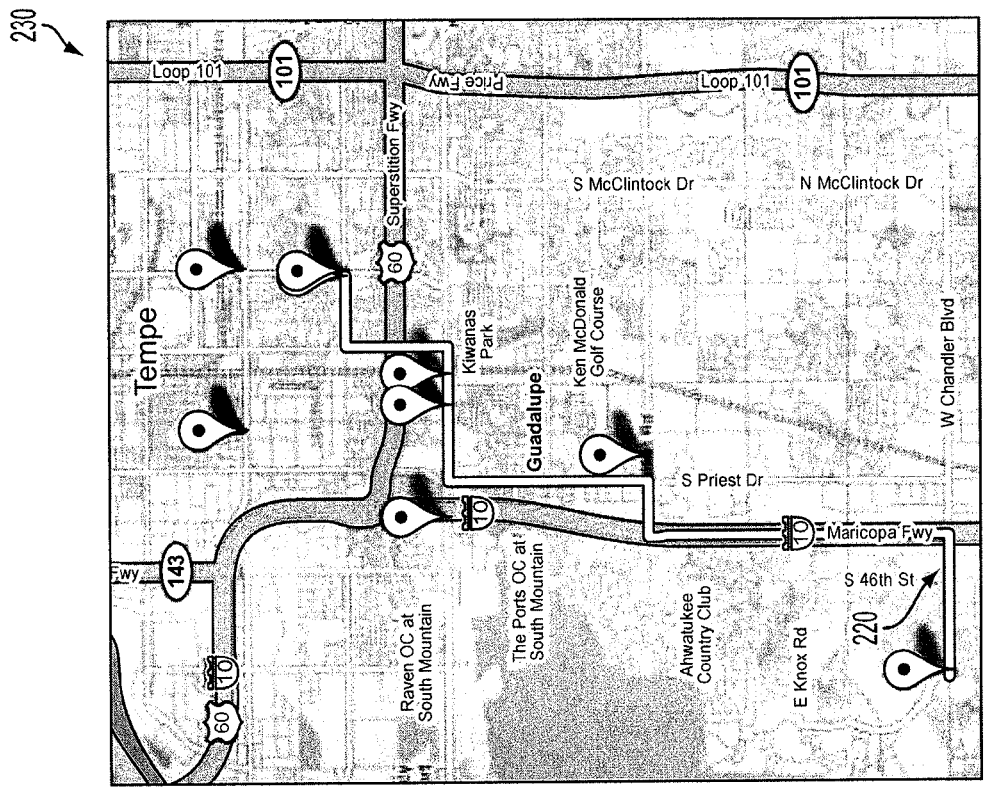
FIG. 5 illustrates the employment of an example embodiment in connection with a map application.
Figure 5:
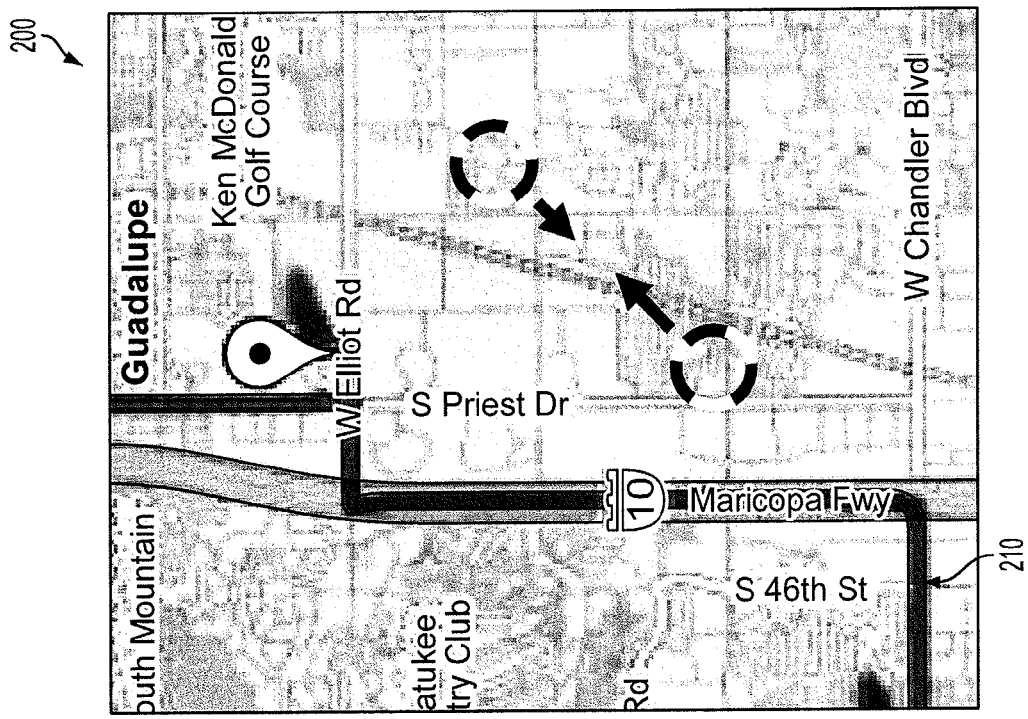

FIG. 5 illustrates the employment of an example embodiment in connection with a map application. In this regard, FIG. 5 illustrates an initial map view 200 that shows a portion of a route 210 from a point of origin to a destination. In response to a fast pinch event (e.g., to zoom out), the next object level zoom may provide for zooming instantaneously to a view that includes the whole route 220. Thus, for example, the full route view 230 may be displayed in response to the fast pinch event. A typical proportional or free zoom would typically either keep the same center or utilize a center defined by the zoom implementation gesture. However, example embodiments may perform an object level based zoom that repositions the center of the resulting view independent of the previous center and/or the position of the zoom implementation gesture. Instead, the center of the object level based zoom view that is generated may be determined based on the object level being displayed. For example, for a full screen view, the center of the full screen image would be displayed, but for a full body or face level view, the center would be roughly the center of the full body portion or face portion of the image.

In some embodiments, waypoints or other points of interest may be defined on a map view or even along a particular route. The waypoints or other points of interest may act as tagged objects, as described above. Thus, for example, in some cases, object level zoom initiation may cause the map view to be zoomed to focus on a point of interest and each point of interest may be cycled through sequentially by further touch events. Alternatively or additionally, the points of interest may be defined at different levels. For example, there may be certain stretches or portions of a route that are tagged as a high level point of interest and specific points along the route that are tagged as lower level points of interest. Thus, an initial object level zoom function implemented from the map view may cause a zoom function to be performed to zoom onto the stretch or portion of the route that was defined as a high level point of interest and a subsequent object level zoom function may cause a zoom function to be performed to zoom onto a specific point of interest defined as a lower level point of interest. Performing the object level zoom functions in reverse may then restore the previous views instantaneously.

Accordingly, some example embodiments of the present invention may provide ways to present views of content items that are quickly changeable and recoverable without significant manual intervention by the user. Content items can be presented at various different viewing levels instantaneously and previously viewed levels can be recreated accurately and easily. Moreover, flexibility may be provided with respect to the user interface effects that can be provided for the same touch gesture by enabling the mechanism by which the characteristics of the movements used to generate the touch gesture (e.g., implementation characteristics) may be classified to prescribe corresponding substantively different user interface effects for respective different implementation characteristic classes.

Figure 6:
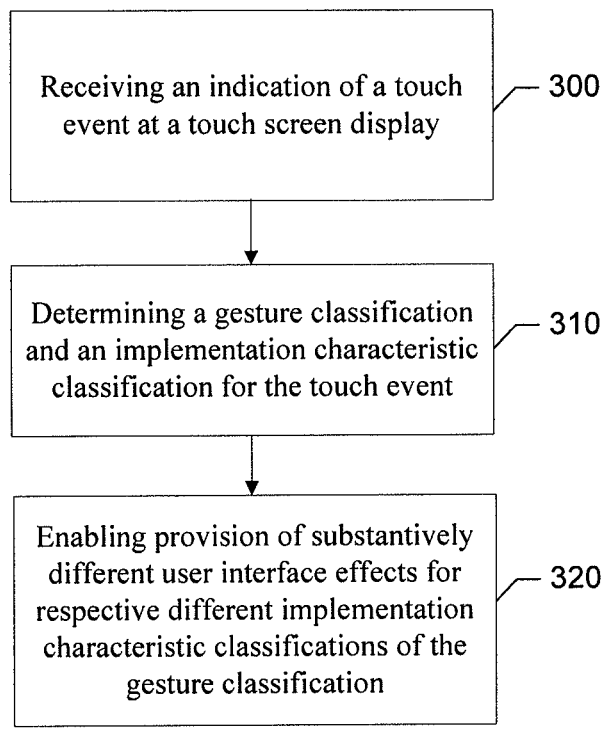
FIG. 6 is a block diagram according to an example method for providing a mechanism by which different user interface effects may be performed for different classifications of gestures according to an example embodiment of the present invention.

FIG. 6 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (either mobile or fixed) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 6, may include receiving an indication of a touch event at a touch screen display at operation 300 and determining a gesture classification and an implementation characteristic classification for the touch event at operation 310. The method may further include enabling provision of substantively different user interface effects for respective different implementation characteristic classifications of the gesture classification at operation 320.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein. In some embodiments, determining a gesture classification may include determining a type of gesture corresponding to the touch event. In an example embodiment, determining the implementation characteristic classification may include determining a status of an implementation characteristic used to initiate a gesture associated with the gesture classification determined for the touch event relative to a threshold. In some cases, enabling provision of substantively different user interface effects for respective different implementation characteristic classifications of the gesture classification may include causing provision of a first user interface effect in response to a first implementation characteristic classification and causing provision of a second user interface effect in response to a second implementation characteristic classification, the first and second user interface effects being substantively different from each other by other than a matter of degree. Alternatively or additionally, enabling provision of substantively different user interface effects for respective different implementation characteristic classifications of the gesture classification may include causing provision of an object level zoom effect in response to a fast pinch event. In some embodiments, causing provision of the object level zoom effect may include providing an instantaneously generated zoom view to a predefined zoom level relative to a full screen view of a content item in response to a fast pinch event, providing an instantaneously generated zoom view of a cropped portion of an image in which the cropped portion includes an object and substantially eliminating background portions surrounding the object in response to a fast pinch event, and/or providing an instantaneously generated zoom view of a previously generated zoom level view in response to reversing a direction of a fast pinch event used to generate an image level view subsequent to the previously generated zoom level view.

In an example embodiment, an apparatus for performing the method of FIG. 6 above may comprise a processor (e.g., the processor 70) configured to perform some or each of the operations (300-320) described above. The processor 70 may, for example, be configured to perform the operations (300-320) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 300-320 may comprise, for example, the touch screen interface 80 (or respective different components thereof). Additionally or alternatively, at least by virtue of the fact that the processor 70 may be configured to control or even be embodied as the touch screen interface 80, the processor 70 and/or a device or circuitry for executing instructions or executing an algorithm for processing information as described above may also form example means for performing operations 300-320.

An example of an apparatus according to an example embodiment may include at least one processor and at least one memory including computer program code. The at least one memory and the computer program code may be configured to, with the at least one processor, cause the apparatus to perform the operations 300-320 (with or without the modifications and amplifications described above in any combination).

An example of a computer program product according to an example embodiment may include at least one computer-readable storage medium having computer-executable program code portions stored therein. The computer-executable program code portions may include program code instructions for performing operation 300-320 (with or without the modifications and amplifications described above in any combination).

In some cases, the operations (300-320) described above, along with any of the modifications may be implemented in a method that involves facilitating access to at least one interface to allow access to at least one service via at least one network. In such cases, the at least one service may be said to perform at least operations 300 to 320.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving an indication of a touch event at a touch screen display;
   determining a gesture classification and an implementation characteristic classification for the touch event, wherein determining a gesture classification comprises determining a type of gesture corresponding to the touch event; and
   for a respective type of gesture, enabling provision of substantively different user interface effects for respective different implementation characteristic classifications of the respective type of gesture, wherein enabling provision of substantively different user interface effects comprises causing provision of an object level zoom effect in response to a first implementation characteristic classification of the respective type of gesture and causing provision of a proportional zoom effect in response to a second implementation characteristic classification of the same respective type of gesture, wherein the object level zoom effect causes borders of an object to be selected within an image so as to maintain the object within a resulting image while reducing background information with the object that is maintained within the resulting image being based upon an importance of the object, and wherein the proportional zoom effect is performed at a rate of zooming proportional to an implementation characteristic.

2. The method of claim 1, wherein determining the implementation characteristic classification comprises determining a status of an implementation characteristic used to initiate a gesture associated with the gesture classification determined for the touch event relative to a threshold.

3. The method of claim 1, wherein enabling provision of substantively different user interface effects for respective different implementation characteristic classifications of the gesture classification comprises causing provision of a first user interface effect in response to a first implementation characteristic classification and causing provision of a second user interface effect in response to a second implementation characteristic classification, the first and second user interface effects being substantively different from each other by other than a matter of degree.

4. The method of claim 1, wherein the first implementation characteristic classification of the respective type of gesture comprises a fast pinch event having a speed of implementation that exceeds a threshold speed.

5. The method of claim 4, wherein causing provision of the object level zoom effect comprises providing an instantaneously generated zoom view to a predefined zoom level relative to a full screen view of a content item in response to the fast pinch event.

6. The method of claim 4, wherein causing provision of the object level zoom effect comprises generating a zoom view on a predetermined portion of interest within an image.

7. The method of claim 6, wherein generating the zoom view of the predetermined portion of interest comprises providing an instantaneously generated zoom view of a cropped portion of the image, the cropped portion including an object and eliminating background portions surrounding the object in response to the fast pinch event.

8. The method of claim 4, wherein causing provision of the object level zoom effect comprises providing an instantaneously generated zoom view of a previously generated zoom level view in response to reversing a direction of the fast pinch event used to generate an image level view subsequent to the previously generated zoom level view.

9. An apparatus comprising at least one processor and at least one memory including computer program code, the at least one memory and the computer program code configured to, with the processor, cause the apparatus to at least:
   receive an indication of a touch event at a touch screen display;
   determine a gesture classification and an implementation characteristic classification for the touch event, wherein determining a gesture classification comprises determining a type of gesture corresponding to the touch event; and for a respective type of gesture, enable provision of substantively different user interface effects for respective different implementation characteristic classifications of the respective type of gesture, wherein enabling provision of substantively different user interface effects comprises causing provision of an object level zoom effect in response to a first implementation characteristic classification of the respective type of gesture and causing provision of a proportional zoom effect in response to a second implementation characteristic classification of the same respective type of gesture, wherein the object level zoom effect causes borders of an object to be selected within an image so as to maintain the object within a resulting image while reducing background information with the object that is maintained within the resulting image being based upon an importance of the object, and wherein the proportional zoom effect is performed at a rate of zooming proportional to an implementation characteristic.

10. The apparatus of claim 9, wherein the at least one memory and the computer program code are configured, with the processor, to determine the implementation characteristic classification by determining a status of an implementation characteristic used to initiate a gesture associated with the gesture classification determined for the touch event relative to a threshold.

11. The apparatus of claim 9, wherein the at least one memory and the computer program code are configured, with the processor, to enable provision of substantively different user interface effects for respective different implementation characteristic classifications of the gesture classification by causing provision of a first user interface effect in response to a first implementation characteristic classification and causing provision of a second user interface effect in response to a second implementation characteristic classification, the first and second user interface effects being substantively different from each other by other than a matter of degree.

12. The apparatus of claim 9, wherein the first implementation characteristic classification of the respective type of gesture comprises a fast pinch event having a speed of implementation that exceeds a threshold speed.

13. The apparatus of claim 12, wherein the at least one memory and the computer program code are configured, with the processor, to cause provision of the object level zoom effect by providing an instantaneously generated zoom view to a predefined zoom level relative to a full screen view of a content item in response to the fast pinch event.

14. The apparatus of claim 12, wherein the at least one memory and the computer program code are configured, with the processor, to cause provision of the object level zoom effect by generating a zoom view on a predetermined portion of interest within an image.

15. The apparatus of claim 14, wherein the at least one memory and the computer program code are configured, with the processor, to generate the zoom view of the predetermined portion of interest by providing an instantaneously generated zoom view of a cropped portion of the image, the cropped portion including an object and eliminating background portions surrounding the object in response to the fast pinch event.

16. The apparatus of claim 12, wherein the at least one memory and the computer program code are configured, with the processor, to cause provision of the object level zoom effect by providing an instantaneously generated zoom view of a previously generated zoom level view in response to reversing a direction of the fast pinch event used to generate an image level view subsequent to the previously generated zoom level view.

17. A computer program product comprising at least one non-transitory computer-readable storage medium having computer-executable program code instructions stored therein, the computer-executable program code instructions comprising program code instructions to:
receive an indication of a touch event at a touch screen display;
determine a gesture classification and an implementation characteristic classification for the touch event, wherein determining a gesture classification comprises determining a type of gesture corresponding to the touch event; and
for a respective type of gesture, enable provision of substantively different user interface effects for respective different implementation characteristic classifications of the respective type of gesture, wherein enabling provision of substantively different user interface effects comprises causing provision of an object level zoom effect in response to a first implementation characteristic classification of the respective type of gesture and causing provision of a proportional zoom effect in response to a second implementation characteristic classification of the same respective type of gesture, wherein the object level zoom effect causes borders of an object to be selected within an image so as to maintain the object within a resulting image while reducing background information with the object that is maintained within the resulting image being based upon an importance of the object, and wherein the proportional zoom effect is performed at a rate of zooming proportional to an implementation characteristic.

18. The computer program product of claim 17, wherein program code instructions for enabling provision of substantively different user interface effects for respective different implementation characteristic classifications of the gesture classification include instructions for causing provision of a first user interface effect in response to a first implementation characteristic classification and causing provision of a second user interface effect in response to a second implementation characteristic classification, the first and second user interface effects being substantively different from each other by other than a matter of degree.

19. The method of claim 1, wherein determining the implementation characteristic classification of the touch event comprises determining the implementation characteristic classification based upon at least one of speed if a touch-related movement or pressure associated with the touch event.

20. The method of claim 1, wherein causing provision of the object level zoom effect comprises causing provision of the object level zoom effect based upon tagged objects within an image presented upon the touch screen display or based upon a plurality of predefined zoom levels.

* * * * *